(No Model.)  3 Sheets—Sheet 1.
G. TAYLOR.
COTTON COMPRESSOR.
No. 364,384.  Patented June 7, 1887.
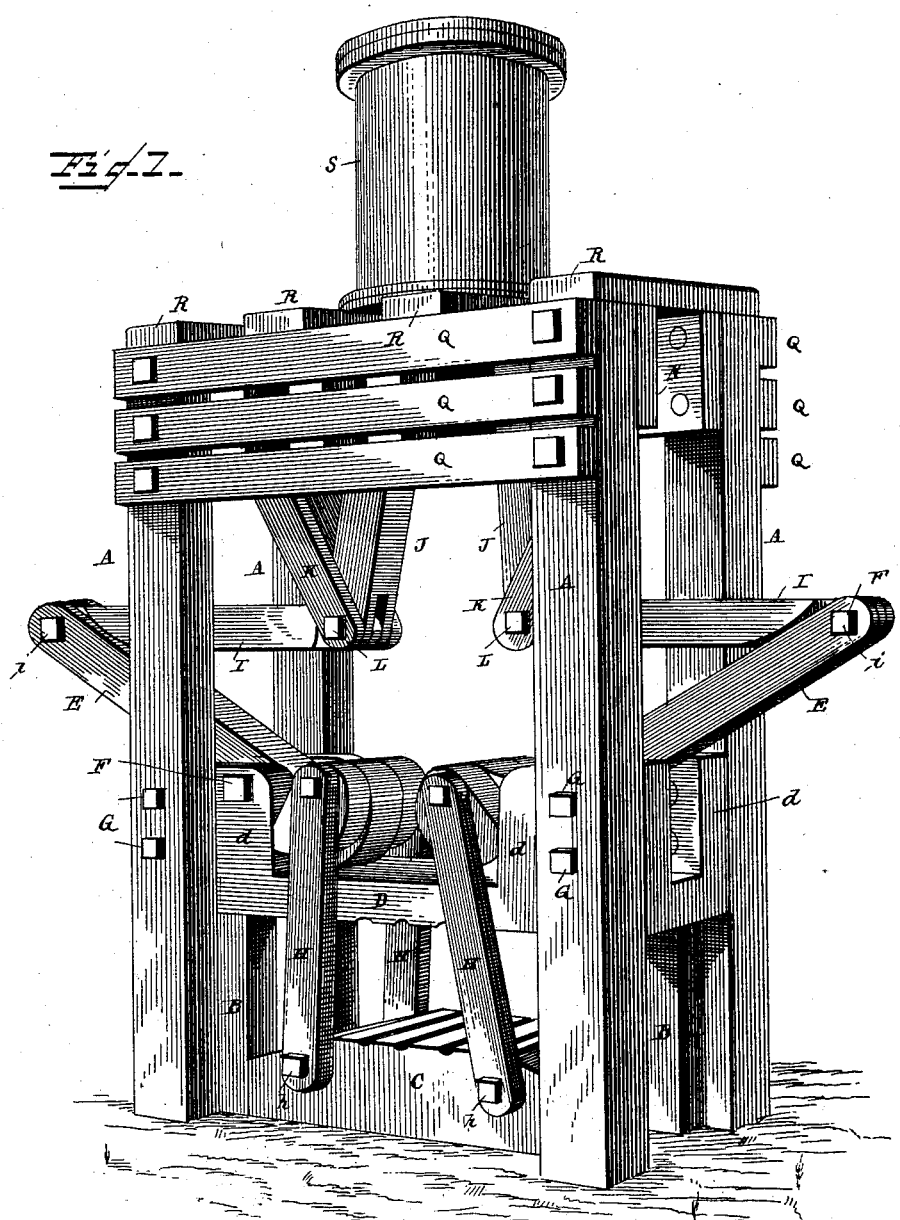
Witnesses
Edwin T. Yewell,
Wm. J. Littell,
Inventor
George Taylor
By his Attorney
J. R. Littell

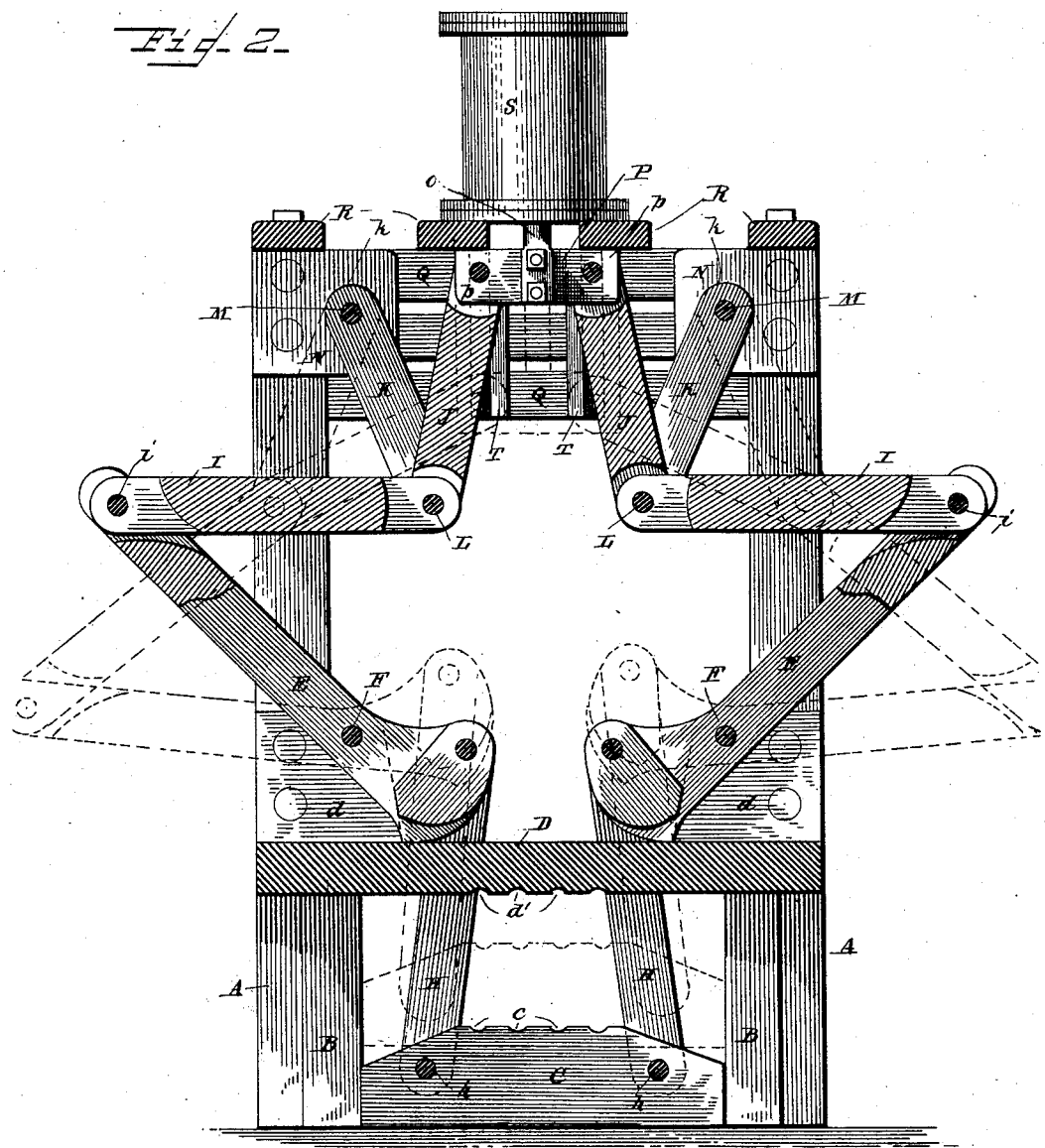

(No Model.) 3 Sheets—Sheet 3.
G. TAYLOR.
COTTON COMPRESSOR.
No. 364,384. Patented June 7, 1887.
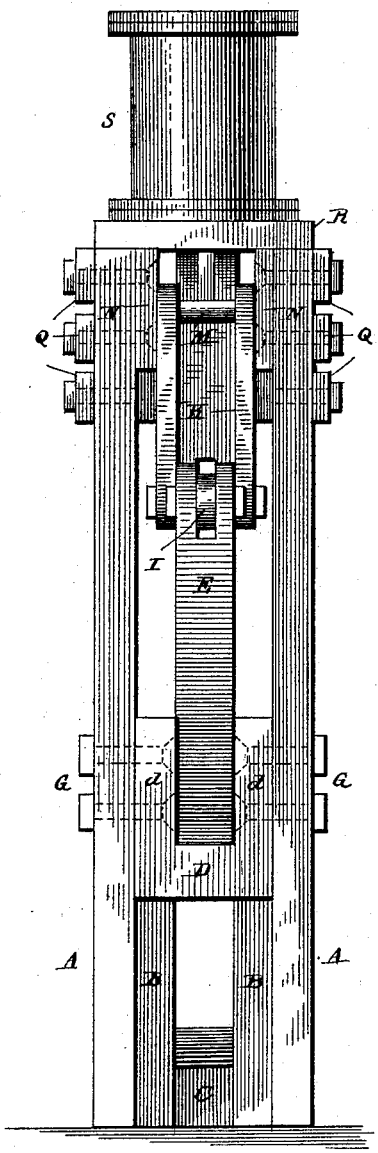
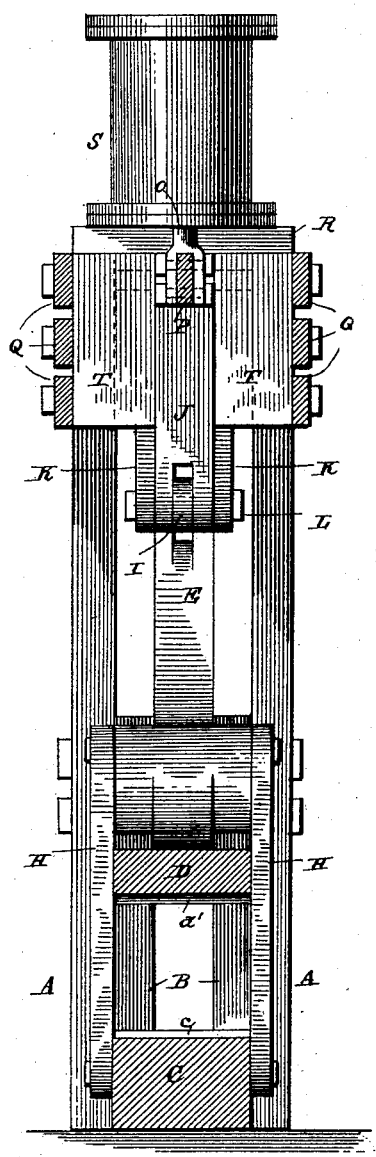
Witnesses
Edwin L. Yewell.
Wm. J. Littell,
Inventor
George Taylor
By his Attorney
J. R. Littell,

UNITED STATES PATENT OFFICE.

GEORGE TAYLOR, OF ENNIS, TEXAS.

COTTON-COMPRESSOR.

SPECIFICATION forming part of Letters Patent No. 364,384, dated June 7, 1887.

Application filed March 10, 1887. Serial No. 230,421. (No model.)

*To all whom it may concern:*

Be it known that I, GEORGE TAYLOR, a citizen of the United States, residing at Ennis, in the county of Ellis and State of Texas, have invented certain new and useful Improvements in Cotton-Compresses; and I do hereby declare that the following is a full, clear, and exact description of the invention, which will enable others skilled in the art to which it appertains to make and use the same.

This invention relates to apparatus for compressing bales of cotton, and for similar purposes; and its object is to provide an improved apparatus of this class which will possess advantages in point of simplicity and inexpensiveness in construction, durability, economy in power, and general efficiency.

To this end the invention consists substantially in an arrangement of double levers adapted to carry the follower and operated by a toggle-joint, to which a piston-rod is directly connected.

In the drawings, Figure 1 is a perspective view of a cotton-compress embodying my invention. Fig. 2 is a vertical longitudinal sectional view thereof. Fig. 3 is an end elevation. Fig. 4 is a vertical transverse sectional view.

Corresponding parts in the figures are denoted by the same letters of reference.

Referring to the drawings, A designates four uprights comprised in the frame of my improved cotton-compress and forming the corner pieces of the same. At the lower ends of these uprights guides B are provided for the vertically-moving follower C, and above these guides is provided a bed-piece, D, extending across the frame and received between the uprights at each side the same. At each end of the bed-piece are formed vertical plates or extensions $d\,d$, between which are fulcrumed levers E by means of a transverse pin, F. The bed-piece is secured in position by means of bolts G, or in any other suitable manner. To the inner ends of the levers E E are pivoted lifting-bars H, which are disposed one at each side the inner end of each lever and extend downwardly at each side the bed-piece, and have their lower ends pivotally connected to the follower, as shown at $h$.

To the outer ends of the main levers E are pivoted the outer ends of levers or rods I, as shown at $i$. The outer ends of the levers E project outwardly from the sides of the frame and between the uprights or corner pieces thereof, and the levers I project inwardly, one at each side, and have their inner ends pivotally connected with rods J J, forming a toggle-joint.

The pivotal joint of the levers I and rods J is supported by means of swinging bars K, one of these bars being arranged at each side the joint and connected therewith by a transverse bolt, L, from which they extend upwardly and have their top ends, $k$, pivoted upon a transverse bolt, M, passing between two flanges or plates, N N, projecting inwardly from the uprights A at the top and at each side the frame.

To the inner ends of the rods J J, forming the toggle-joint, the end of the piston-rod O is pivotally connected, this joint being preferably formed by providing a T-head at the end of the piston-rod, the ends of the rods J J being pivoted, respectively, to the laterally-projecting flanges $p\,p$ of the T-head P.

At the top of the frame the uprights are connected by transverse beams Q, suitable cross-beams being provided above the latter, as shown at R. The cylinder S is mounted upon the cross-beams R at the top of the frame, and supported thereby. Upon the series of transverse beams Q are provided vertically-disposed inwardly-projecting guide-plates T, the T-head P and the inner ends of the rods J J being adapted to work between the plates T, projecting from opposite sides of the frame, and are guided thereby.

The top face of the follower and the under face of the bed-piece may be provided with the usual transverse grooves, $c\,d'$, respectively, to accommodate the bale-bands.

The operation and advantages of my invention will be readily understood by those skilled in the art to which it appertains. In practice the frame of the compress is preferably constructed about forty feet in height, with a length of about nineteen feet from end to end and a width of seven feet. In this size compress the cylinder would be nine and a half feet in length, fifty inches diameter, and the piston rod ten feet in length, thus giving a stroke of about nine feet. By the stroke of the piston and operation of the toggle-joint and levers, as illustrated in dotted lines, Fig. 2, the follower is moved vertically, and the bale compressed between the top surface of the follower and the under face of the bed-piece. By this improved arrangement of double levers, operated by the direct action of the piston upon a connecting toggle-joint, great power is exerted upon the follower with a comparatively small expenditure of steam, the power accumulating during the stroke by means of the improved arrangement of double levers and toggle-joint and the greatest power being exerted at the point most desired—that is, when the bale is nearly compressed.

It is manifest that numerous modifications may be made in the construction and arrangement of parts, and I do not therefore limit myself to the construction herein shown, but reserve the right to all such modifications as properly fall within the spirit and scope of my invention.

I claim as my invention—

1. The combination, in a compress, with the follower, of the levers projecting inwardly and having their inner ends pivotally connected with the follower, rods I, pivotally connected to the outer ends of the levers and projecting inwardly, rods J, extending upwardly from the inner ends of rods I and forming a toggle-joint, and a piston-rod connected directly to the toggle-joint formed by rods J and I, substantially as set forth.

2. The combination, in a compress, with the follower, of a series of levers and rods comprising the inwardly-projecting levers, having their inner ends pivotally connected with the follower, rods I, pivoted to the outer ends of the levers, a toggle-joint pivotally connected with the rods I, and a piston-rod directly acting upon a toggle-joint, substantially as and for the purpose set forth.

3. The combination, in a compress, with the follower, of the levers having their inner ends pivotally connected with the follower, rods pivotally connected with the outer ends of the levers, a toggle-joint pivotally connected with the inner ends of the rods, pivoted bars supporting the joint between the rods and the toggle-joint, and the piston-rod connected with the latter, substantially as and for the purpose set forth.

4. The combination, in a compress, with the follower, of the levers, lifting-bars pivotally connecting the inner ends of the levers and the follower, rods pivoted to the outer ends of the levers, a toggle-joint connecting the inner ends of the levers, a piston-rod pivotally connected with the toggle-joint, and pivoted supporting-bars pivotally connected with the joint between the rods and the toggle-joint, substantially as and for the purpose set forth.

5. The combination of the frame of a compress, the bed-piece supported thereby, the follower adapted to move vertically under the bed-piece, levers fulcrumed above the latter, lifting-bars pivotally connecting the ends of said levers and the follower, rods pivotally connected with the levers, a toggle-joint connecting the ends of the rods, pivoted bars supporting the joint between the rods and the toggle-joint, and a piston-rod pivotally connected with the toggle-joint, substantially as and for the purpose set forth.

6. In a compress, the combination of the uprights comprised in the frame, vertical guides B, provided at the corners of the frame upon the lower end of the uprights, a bed-piece disposed across the frame above said guides, levers fulcrumed above the bed-piece and projecting inwardly above each end thereof, a follower adapted to move vertically within said guides, lifting-bars pivotally connecting the inner ends of the levers and the follower, and means for operating the levers, substantially as and for the purpose set forth.

7. In a compress, the combination, with the frame, of a transverse bed-piece having vertical plates or extensions $d\ d$ at each end, the follower adapted to move vertically under the bed-piece, and levers fulcrumed between said extensions $d\ d$ and having their inner ends pivotally connected with the follower, substantially as and for the purpose set forth.

8. In a compress, the combination, with the rods I and J, forming the toggle-joint, of swinging supporting-bars having one end pivotally connected to the frame and the other end pivoted to the joint between the said rods, substantially as and for the purpose set forth.

9. The combination, with the frame of a compress comprising the uprights having inwardly-projecting flanges or plates at their upper ends, and with levers E, bars I, and the rods forming the toggle-joint, of the swinging supporting-bars pivotally connected to the joint between the bars I and rods supporting the toggle-joint and having their other ends pivoted to said projecting flanges, substantially as and for the purpose set forth.

10. The combination, with the frame of a compress comprising end uprights and transverse top beams, the latter carrying inwardly-projecting guide-plates T, of a toggle-joint comprising rods I and J, pivotally connected with the levers for operating the follower, and a piston-rod pivotally connected to the inner ends of the rods, forming the toggle-joint, the ends of said rods being received between the guide-plates projecting from opposite sides of the frame, substantially as and for the purpose set forth.

In testimony whereof I affix my signature in presence of two witnesses.

GEORGE TAYLOR.

Witnesses:
 P. C. BROWN,
 T. P. BRAGG.